3,038,829
LAMINATED ARTICLE
Robert Charles Koch and Walter C. Rowe, Akron, Ohio, assignors to The Firestone Tire & Rubber Company, Akron, Ohio, a corporation of Ohio
Filed Oct. 1, 1956, Ser. No. 613,091
6 Claims. (Cl. 154—52)

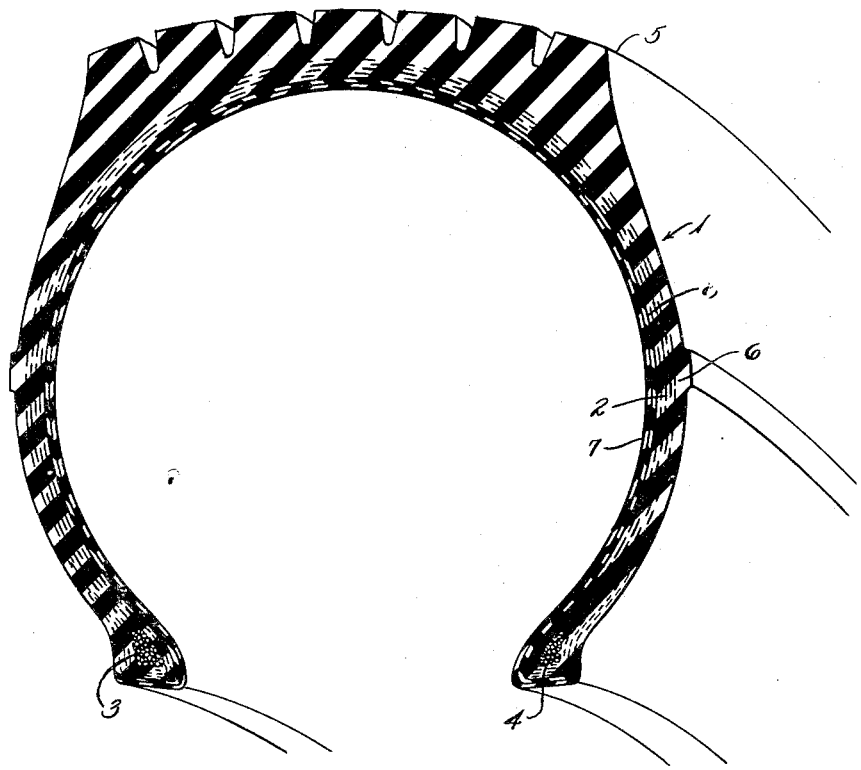

This invention relates to improved adhesive bonds in vulcanized structures comprised of layers of rubbery copolymers of butadiene and styrene and rubbery layers formed of copolymers of a major portion of an isoolefin and a minor portion of an open chain conjugated diolefin. More particularly, the invention relates to an improved vulcanized bond between layers of the so-called GR–S polymers and layers of butyl rubber.

The adhesion of the butyl type polymers to copolymers of butadiene and styrene is poor for the reason that during the vulcanization reaction, the GR–S polymers having much greater unsaturation than the butyl rubber "hog" the vulcanizing agent such as sulfur with the result that the butyl rubber does not vulcanize satisfactory. This difficulty has resulted in poor vulcanized adhesion between layers of GR–S polymer vulcanized to layers of butyl rubber in laminated articles.

The present invention overcomes the difficulties of the prior art in adhering GR–S to butyl by the addition of silica to one of the rubbery components of the laminate and the bromination of the butyl portion of the laminate before the article is vulcanized.

It is therefore an object of the invention to improve the vulcanized bond between layers formed from copolymers of butadiene and styrene and layers formed from copolymers of a major portion of an isoolefin having from 4 to 8 carbon atoms and a minor portion of an open chain conjugated diolefin having from 4 to 7 carbon atoms. It is also an object of the invention to improve the adhesion of layers of GR–S to layers of butyl rubber by incorporating silica in one of the layers and brominating the butyl rubber used in the butyl layer. Yet a further object of the invention is to provide a rubbery article comprised of laminated layers of GR–S and butyl rubber having a good vulcanized bond between layers thereof through the incorporation of silica in the rubbery polymer of one layer and the use of brominated butyl rubber in the other layer. These and other objects of the invention will be more fully understood with reference to the specification, claims and the drawing which is a perspective view partially broken away to show the invention as used in a pneumatic tubeless tire.

Butyl rubber of the type used in the invention may be prepared by the procedure disclosed by Robert M. Thomas and William J. Sparks in U.S. Patent No. 2,356,128 which consists in preparing a mixture of an isoolefin such as isobutylene in the proportion of from 70 to 99 parts with an open chain conjugated diolefin such as butadiene or isoprene in the proportion of 30 to 1 parts. The mixture is then cooled to a relatively low temperature, preferably below −50° C., in the presence of a metal halide catalyst such as aluminum chloride. The polymerization results after further treatment in a rubbery vulcanizable material.

One procedure for brominating butyl rubber is disclosed in U.S. Patent No. 2,631,984 to Crawford et al., wherein butyl rubber is mixed with brominating substances or subjected to the action of free bromine. Brominated butyl is sold on the market under the trade name "Hycar" by the B. F. Goodrich Chemical Company of Cleveland, Ohio.

In the preparation of the GR–S polymers used in the invention, butadiene and styrene are brought together under conditions that result in the copolymerization of these two monomers. Although the polymerization of the two monomers generally takes place at a temperature of 122° F., it is also possible to obtain excellent rubbery materials by copolymerizing the monomers at lower temperatures such as 58° F., 41° F., 14° F., 0° F., and −14° F. Such materials are described in an article in Industrial and Engineering Chemistry, May 1948 by McKenzie, Samuels and Sheron. Copolymers formed at these depressed temperatures are generally known as low temperature polymers (L.T.P.) or "cold rubber." Although the invention is satisfactory with all the GR–S polymers, L.T.P. is preferred for the best adhesion results.

In practicing the invention, the GR–S polymer is masticated on an open two roll mill or in a closed rubber mixer such as a Banbury mixer. Various pigments are added during the mastication of the copolymers according to the following formula, all parts in this and other stocks herein being by weight of rubbery copolymers present:

|  | Stock A Control | Stock B |
|---|---|---|
| GR–S (L.T.P.) | 100 | 100 |
| Carbon Black | 45 | 20 |
| Silica [1] |  | 25 |
| Zinc Oxide | 3 | 3 |
| Stearic Acid | 2 | 2 |
| Cumar MH 2½ | 10 | 10 |
| Sulfur | 3 | 3 |
| Accelerator | 1.2 | 1.2 |
| Dipropylene glycol | 1.5 | 1.5 |
|  | 165.7 | 165.7 |

[1] Hi-Sil manufactured by Columbia Southern Chemical Co., Pittsburgh, Pa.

The rubbery compounds according to the above formulation were formed into sheets on a rubber calender and prepared for lamination to the butyl layers as will be described.

In compounding the halogenated butyl rubber portion of the laminated article, the polymer was broken down on a two roll mill and various pigments were incorporated therein according to the following formula:

STOCK C

| | |
|---|---|
| Natural rubber [1] | 20.0 |
| Brominated butyl rubber | 80.0 |
| Carbon black | 40.0 |
| Stearic acid | .4 |
| Zinc oxide | 7.0 |
| Oil | 3.0 |
| Retarder | .3 |
| Sulfur | 2.0 |
| Mercaptobenzothiazole | .7 |
| Tetramethyl thiuram disulfide | .35 |
|  | 153.75 |

[1] Present to provide building tack.

A non-halogenated butyl rubber compound was prepared according to the following formula:

STOCK D

| | |
|---|---|
| Natural rubber | 20.00 |
| Butyl rubber | 80.00 |
| Carbon black | 40.00 |
| Stearic acid | .40 |
| Zinc oxide | 7.00 |
| Softening oil | 3.00 |
| Retarder | .30 |
| Mercaptobenzothiazole | .70 |
| Tetramethyl thiuram disulfide | .35 |
|  | 151.75 |

The brominated butyl rubber compound (Stock C) and the butyl rubber compound of Stock D were each sheeted out on a calendar to a thickness of one quarter inch and cut into sheets having a dimension of 6 inches x 9 inches. A sheet of each was superimposed on a sheet of the GR-S compound Stock A to form a laminated structure. A strip of holland cloth was placed between the two sheets at the edges thereof to provide two free ends after vulcanization. (The ends are grasped by the testing machine after vulcanization and used to pull the vulcanized sheets apart to measure adhesion.) Each structure was sandwiched between two sheets of unvulcanized rubberized weftless fabric and each was vulcanized in a vulcanizing press at a temperature of 280° F. for 90 minutes, removed from the press and cut into strips 1" wide. The free ends were mounted respectively in the jaws of a Cooey adhesion tester and drawn apart at a rate of 2 inches per minute. Adhesion between the vulcanized sheets is measured in pounds/inch at both ambient temperature and at an elevated temperature of 250° F.

Adhesion results were as follows:

*Table I*

| Test Pad | Stock D adhered to Stock B (Butyl no Bromine to GR-S with SiO₂) | Stock C adhered to Stock A (Brominated Butyl to GR-S no SiO₂) | Stock C adhered to Stock B (Brominated Butyl to GR-S with SiO₂) |
| --- | --- | --- | --- |
| Cooey Adhesion: Room Temp. pounds | 12 | 64 | 100 |
| 250° F. do | 2 | 13 | 25 |

The results of the above table show that the combined use of silica in the GR-S polymer with bromine in the butyl rubber greatly improves the hot and cold adhesion between the layers. The rate of vulcanization of the GR-S portion containing silica is retarded somewhat. This may be corrected by increasing the sulfur and/or accelerator to adjust the rate to that required. Other ingredients which may be added to both the GR-S portion and the butyl rubber portion include antioxidants, softeners and reinforcing pigments as necessary to obtain desired results without effecting the improved adhesion obtained by the invention.

To determine the range of silica best suited for bonding GR-S to brominated butyl rubber, GR-S compounds were prepared using the base Stock A above and varying the silica content as shown below (the amount of silica is in parts by weight per 100 parts GR-S). Adhesion tests were run on cured laminates of these GR-S stocks to a brominated butyl rubber compound having the formula of Stock C. The results of these adhesion tests were as follows:

*Table II*

| Silica Content in GR-S | 0 | 5 | 10 | 20 | 50 |
| --- | --- | --- | --- | --- | --- |
| Adhesion, lbs./in.: Room Temperature | 18 | 24 | 34 | 52 | 80 |
| 250° F | 4 | 5 | 7 | 22 | 30 |

From the above results, it may be noted that the presence of silica in the GR-S component of a laminated article greatly improves the adhesion of that component to adjacent brominated butyl rubber portions to which it is vulcanized. For best results within the range of the invention, from 10 to 90 parts of silica based on the weight of polymer present is used while from 30 to 60 parts is preferred.

The silica may be added to the butyl rubber portion of the combination as well as to the GR-S portion. When silica is added to the butyl portion, the steps of mixing the compounds and vulcanizing may be carried out as described with the same improved adhesion. The silica prepared is hydrated SiO₂ sold by the Columbia Southern Chemical Company under the trade name of Hi-Sil.

Referring to the drawing, a tubeless pneumatic passenger tire generally indicated at 1 is comprised of a fabric reinforced portion 2 terminating at each edge in inextensible beads 3 and 4. Superimposed on fabric portion 2 is a tread portion 5 and a sidewall portion 6. To make the tire a pneumatic container without the use of an inner tube, a liner portion 7 of butyl rubber is adhered across the open belly of the tire from bead to bead.

To adhere the liner 7 to the tire casing in view of the present invention, an intermediate layer 8 comprised of GR-S loaded with silica is inserted between the casing and the liner and adhered to both these portions by vulcanization. Whereas the prior art butyl rubber liner would easily separate from the belly of the tire casing during operation of the tire because of the poor adhesion of butyl to GR-S, the present invention through the use of the ply 8 provides satisfactory adhesion to make the liner 7 an integral part of the tire.

The GR-S layer may be applied to the unvulcanized layers of the article to be vulanized as a solvent adhesive. To do this, Stock B or any of the stock formulations of Table II is dissolved in a rubber solvent such as gasoline, toluene, xylene or the like until a total solids concentration of about 10% by weight is obtained. The adhesive may then be used to adhere a brominated butyl rubber layer to layers of GR-S, natural rubber, as well as layers of copolymers of butadiene and acrylonitrile (Buna N) and rubber chloroprene polymers such as neoprene.

Referring to the drawing, the ply 8 may be applied either as a calendered sheet or as an adhesive solution as described above. When applied as an adhesive, the belly of the unvulcanized tire band is coated with the adhesive solution and allowed to stand until the solvent portion of the adhesive evaporates leaving a tacky surface. The unvulcanized sheet of butyl rubber next is applied to the tacky surface and pressed into intimate face to face contact with the surface, care being taken to prevent trapping of air between the butyl sheet and the tire band. The tire is shaped and vulcanized with heat and pressure in a conventional manner with the result that the butyl rubber layer 7 is firmly adhered to the tire casing.

Those skilled in the art will be able to select compounding pigments such as vulcanizing agents, antioxidants, softeners, reinforcing agents and the like to arrive at desired physical properties for the vulcanized compounds of the invention.

Although several forms have been illustrated by way of example, it will be apparent to those skilled in the art that modification may be made in the invention within the scope of the following claims.

We claim:

1. A composite vulcanizable rubbery article comprising prior to vulcanization a first layer of vulcanizable rubbery copolymer of butadiene and styrene containing from about 10 to about 60 parts by weight silica per 100 parts by weight of said copolymer and a second layer of vulcanizable rubbery brominated copolymer of a major portion of an isoolefin and a minor portion of an open chain conjugated diolefin, said first and second layers being vulcanized together.

2. A composite rubbery article according to claim 1 wherein said first layer contains from about 30 to about 60 parts by weight silica per 100 parts by weight of the butadiene-styrene copolymer.

3. A composite rubbery article according to claim 1 wherein said first layer contains about 50 parts by weight silica per 100 parts by weight of the butadiene-styrene copolymer.

4. A composite vulcanizable rubbery article comprising prior to vulcanization a first layer of vulcanizable rubbery copolymer of butadiene and styrene containing from about 10 to about 60 parts by weight silica per 100 parts by weight of said copolymer and a second layer of a vulcanizable mixture of natural rubber and rubbery brominated copolymer of a major portion of an isoolefin and a minor portion of an open chain conjugated diolefin, said first and second layers being vulcanized together.

5. A composite rubbery article according to claim 4 wherein said first layer contains from 30 to 60 parts by weight silica per 100 parts by weight of the butadiene-styrene copolymer.

6. A composite rubbery article according to claim 4 wherein said first layer contains about 50 parts by weight silica per 100 parts by weight of the butadiene-styrene copolymer.

References Cited in the file of this patent

UNITED STATES PATENTS

| | | |
|---|---|---|
| 2,442,083 | Hall et al. | May 25, 1948 |
| 2,467,322 | Lightbown et al. | Apr. 12, 1949 |
| 2,483,754 | Clifton | Oct. 4, 1949 |
| 2,583,387 | Morrissey et al. | Jan. 22, 1952 |
| 2,631,984 | Crawford et al. | Mar. 17, 1953 |
| 2,668,789 | Phreaner | Feb. 9, 1954 |
| 2,698,041 | Morrissey et al. | Dec. 28, 1954 |
| 2,698,042 | Perkins | Dec. 28, 1954 |
| 2,720,479 | Crawford et al. | Oct. 11, 1955 |
| 2,760,894 | Wolf | Aug. 28, 1956 |
| 2,788,839 | Kindle et al. | Apr. 16, 1957 |
| 2,804,448 | Hallenbeck | Aug. 27, 1957 |
| 2,824,038 | Wilson et al. | Feb. 18, 1958 |
| 2,825,675 | Wilson et al. | Mar. 4, 1958 |
| 2,874,743 | Rowe | Feb. 24, 1959 |